United States Patent

Saito

[11] Patent Number: 5,809,170
[45] Date of Patent: Sep. 15, 1998

[54] METHOD FOR AUTOMATICALLY RECOGNIZING LINE SYMMETRY OF A FIGURE

[75] Inventor: Shigeru Saito, Tokyo, Japan

[73] Assignee: NEC Corporation, Tokyo, Japan

[21] Appl. No.: 604,037

[22] Filed: Feb. 20, 1996

[30] Foreign Application Priority Data

Feb. 20, 1995 [JP] Japan .................................. 7-054962

[51] Int. Cl.$^6$ ............................. G06K 9/46; G06T 11/00; G06T 3/20
[52] U.S. Cl. ......................... 382/203; 345/433; 345/438
[58] Field of Search ..................................... 345/433, 438, 345/441, 442, 443, 468; 382/203

[56] References Cited

U.S. PATENT DOCUMENTS 4,797,842 1/1989 Nackman et al. ...................... 364/300

FOREIGN PATENT DOCUMENTS 62-111369 5/1987 Japan .
63-261481 10/1988 Japan .

Primary Examiner—Leo H. Boudreau
Assistant Examiner—Nhan Le
Attorney, Agent, or Firm—Foley & Lardner

[57] ABSTRACT

In a line-symmetrical figure shaping system, all the symmetry axis candidates of an input figure are generated based on feature data extracted from the input figure. Pairs of points on the input figure on both sides of each symmetry axis candidate are extracted, and a symmetry axis judgment segment is generated which connects the points of each pair. The distance between the middle point of the symmetry judgment segment and the symmetry axis candidate is calculated. The angle formed by the symmetry judgment segment and the symmetry axis candidate and the difference from 90° are also calculated. Based on the distances and angular differences for the respective symmetry judgment segments, it is judged whether the input figure is symmetrical with respect to the symmetry axis candidate. The input figure is shaped into a figure that is completely line-symmetrical with respect to the symmetry axis candidate that has been judged to provide line symmetry.

42 Claims, 14 Drawing Sheets

INPUT FIGURE

SHAPED FIGURE

SYMMETRY AXIS CANDIDATE GENERATION

METHOD FOR AUTOMATICALLY RECOGNIZING LINE SYMMETRY OF A FIGURE

BACKGROUND OF THE INVENTION

1. Field of the Invention

The present invention relates to a figure shaping system and, more specifically, to a line-symmetrical figure shaping method and system which generates a single line-symmetry axis from an input figure and shapes the input figure into a figure that is line-symmetrical with respect to the generated axis.

2. Description of the Related Art

In manually drawing a figure through a keyboard or with a mouse, a pen, or the like by using a drawing processor such as a word processor or a personal computer, a rough figure can be generated easily but it is laborious to draw, for instance, a figure that is line-symmetrical with respect to a certain axis. To draw a figure of the latter type, it will be helpful if there exists a figure processor that, by itself, recognizes the symmetry of an input figure and automatically corrects it into a line-symmetrical figure. However, at present, no figure processor having such a function is known. Therefore, the development of a line-symmetrical figure shaping apparatus which generates a single line-symmetry axis from an input figure and shapes the input figure into a figure that is line-symmetrical with respect to the generated axis is now desired eagerly.

To realize such a line-symmetrical figure shaping apparatus, it is prerequisite to provide a function of automatically recognize the line symmetry of an input figure. Conventionally, there are known the following methods of recognizing the symmetry of an input figure.

According to a first conventional method, a symbol table is prepared which defines whether each symbol is symmetrical. An input figure is recognized by pattern matching, feature matchings or the like, and it is determined which of the symbols is identical with the input figure. If it becomes apparent by referring to the symbols table that the identified symbol is symmetrical, the input figure is recognized as being symmetrical. (see Japanese Patent Application Laid-open No. 62-111369.) This method will be described below in more detail with reference to a flowchart of FIG. 1.

In FIG. 1, a recognition object image (symbol element) is subjected to recognition processing such as a pattern matching method (step V1), and a recognition result 1a is generated that indicates which of the predetermined symbols is identical with the object image (step V2). Then, reference is made to a symbol table that defines whether each symbol is symmetrical. If the symbol of the recognition result 1a is defined as being symmetrical, the object image is judged to be symmetrical. Otherwise, the object image is judged to be unsymmetrical (step V3).

When the object image is judged to be symmetrical, the following process is executed, because a single reading operation may cause erroneous recognition at a high probability. First, the object image that has been judged to be symmetrical is symmetrically transformed (step V4), and the transformed object image is again subjected to the recognition processing (steps V5 and V6). A current recognition result 2a is compared with the previous recognition result 1a (step V7) If they are identical, the recognition result 1a is output as a result of the process (step V8). If they are not identical, the object image is rejected as being impossible to recognize (step V9).

According to a second conventional method, a symmetry axis candidate segment (center line) that is drawn in an input figure and will possibly become a symmetry axis is extracted. If all the segments drawn from the respective apexes of the input figure perpendicularly to the symmetry axis candidate segment are approximately equally divided by the symmetry axis candidate segment, the input figure is judged to be symmetrical. (See Japanese Patent Application Laid-Open No. 63-261481.) The technique described in this publication will be explained below with reference to FIGS. 2 and 3.

First, image data is converted into vector data by polygonal line approximation. The vector data is classified as one of a symbol, a character, and line segments, and then classified into configurational lines, center lines, and other lines. Further, distinction between a character and a symbol is made, and the vector data is stored with an attribute based on a discrimination result attached thereto.

Next, the recognition result data is loaded (step W1). Center lines that will possibly become a symmetry axis are extracted from the data, and are counted (step W2). It is checked for each of the extracted center lines whether there exists a configurational line that intersects the center line or configurational lines that are isolated from it on both sides in the vertical or horizontal direction (step W3). If a center line that intersects a configurational line or has isolated configurational lines on both sides ("present" in step W4), the symmetry of the configurational line or the isolated configurational lines is checked (step W5).

A method of judging the symmetry will be described with reference to FIG. 3. For example, a perpendicular L2 is drawn from an end point P2 of a vector to a center line b, and a distance 12 between the end point P2 and the center line b is calculated. Further, a distance m2 between the center line b and an intersection X2 of an extension of the perpendicular L2 and a vector c is calculated. And then a difference between the distances 12 and m2 is calculated. If a relationship $$|12-m2|<\Delta\tfrac{1}{2} \tag{1}$$

is satisfied where $\Delta\tfrac{1}{2}$ is a given threshold, then similar calculation is performed on the other end points. If the inequality (1) is satisfied for all the end points and the sum of the differences in distance (an integer number: n ranges from 1 to the number of all the end points) satisfies the following inequality:

$$\Sigma|1n-mn|<Q \tag{2}$$

where Q is a given threshold, then the configurational lines concerned are judged to be symmetrical ("symmetrical" in step W6). After the symmetry judgment is performed on all the center lines, abbreviated drawing information is set based on part of drawing information attached to the symmetrical configurational lines (step W7).

As described above, recognizing the symmetry of an input figure is performed conventionally. However, in the first conventional method, it is necessary to define all the figures that should be judged to be symmetrical and register those figures in a symbol table in advance. Therefore, the symmetry judgment cannot be performed when an undefined object figure is input.

In contrast, in the second conventional method, it is not necessary to define figures that should be judged to be symmetrical, because symmetry axis candidate segments (center lines) that are drawn in an input figure and will possibly become a symmetry axis are extracted and, in the following processing, the symmetry judgment is conducted by using those extracted symmetry axis candidate segments. However, since symmetry axis candidate segments such as center lines drawn in an input figure need to be extracted, this method cannot accommodate a case where no such symmetry axis candidate segment is drawn in the input figure. In inputting a figure, a user is required to write its symmetry axis separately.

SUMMARY OF THE INVENTION

An object of the present invention is to provide a method for automatically extracting a symmetry axis from a figure that has been drawn by a user without any restriction on its form and without considering its symmetry axis.

Another object of the present invention is to provide a line-symmetrical figure shaping system and method which automatically extracts a symmetry axis from a figure that has been drawn by a user without any restriction on its form and without considering its symmetry axis, and shapes the input figure into a figure that is line-symmetrical with respect to the extracted symmetry axis.

In a line-symmetrical figure shaping system according to the present invention, all the symmetry axis candidates that will possibly become a symmetry axis of an input figure that should be shaped into a line-symmetrical figure are generated based on feature data that have been extracted from the input figure (symmetry axis candidate extraction). Then, pairs of points on the input figure on both sides of each symmetry axis candidate are extracted, and a symmetry axis judgment segment is generated which connects the points of each pair (symmetry judgment segment generation). The distance between the middle point of the symmetry judgment segment and the symmetry axis candidate is calculated (symmetry axis distance calculation). Further, the angle formed by the symmetry judgment segment and the symmetry axis candidate is calculated, and its difference from 90 is calculated (symmetry axis angle calculation). Based on the distances and angular differences that have been calculated for the respective symmetry judgment segments, it is judged whether the input figure is symmetrical with respect to the symmetry axis candidate concerned (symmetry judgment). The input figure is shaped into a figure that is completely line-symmetrical with respect to the symmetry axis candidate that has been judged to provide line symmetry (symmetrizing).

All the symmetry axis candidates that will possibly become a symmetry axis of the input figure is generated in the following manner. For example, where the number of apexes of the input figure is an odd number, line segments each connecting an apex and the middle point of a side that is opposed to the apex are employed as the symmetry axis candidates. Where the number of apexes is an even number, line segments each connecting a pair of apexes opposed to each other and line segments each connecting a pair of middle points of sides opposed to each other are employed as the symmetry axis candidates.

The symmetry judgment segments are generated in the following manner. For instance, pairs of apexes that are located on both sides of the symmetry axis candidate concerned are calculated from one point to the other point where the symmetry axis candidate intersects the input figure. Straight line segments each connecting a pair of apexes thus calculated are employed as the symmetry judgment segments.

The input figure may be shaped by using, as a symmetry axis, a symmetry axis candidate that is first judged to provide symmetry. Alternatively, a symmetry axis providing the highest degree of symmetry may be selected from the symmetry axis candidates that have been judged to provide symmetry at the time point when all the symmetry axis candidates have been subjected to the symmetry judgment.

It is preferred that when there exists a symmetry axis candidate that appears horizontal or vertical in a displayed picture of the input image, the horizontal or vertical symmetry axis candidate is processed with preference.

DETAILED DESCRIPTION OF THE PREFERRED EMBODIMENTS

Embodiments of the present invention will be hereinafter described in detail with reference the accompanying drawings.

FIRST EMBODIMENT

Figure 1:
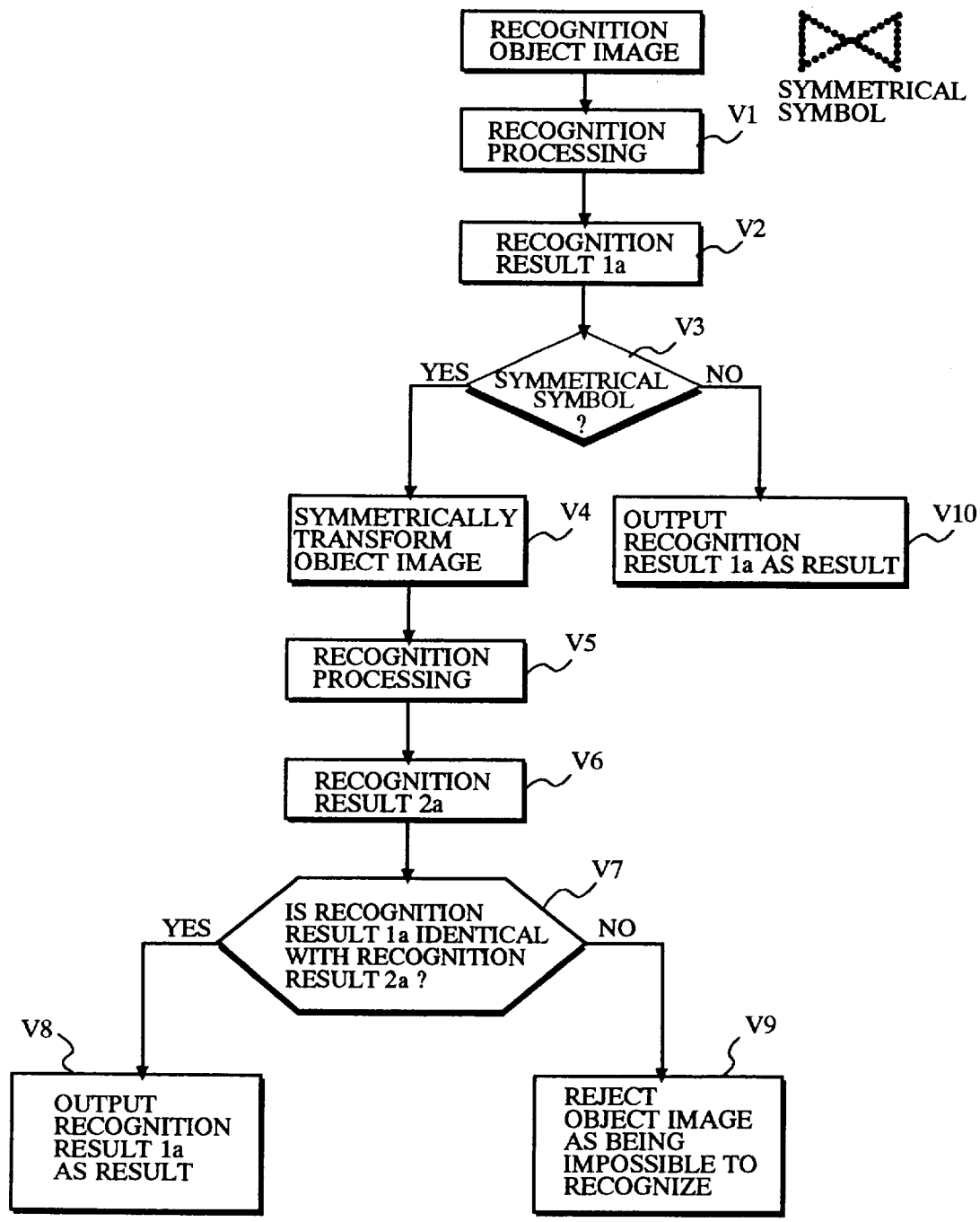
FIG. 1 is a block diagram showing a flowchart showing a first conventional process.
Figure 2:
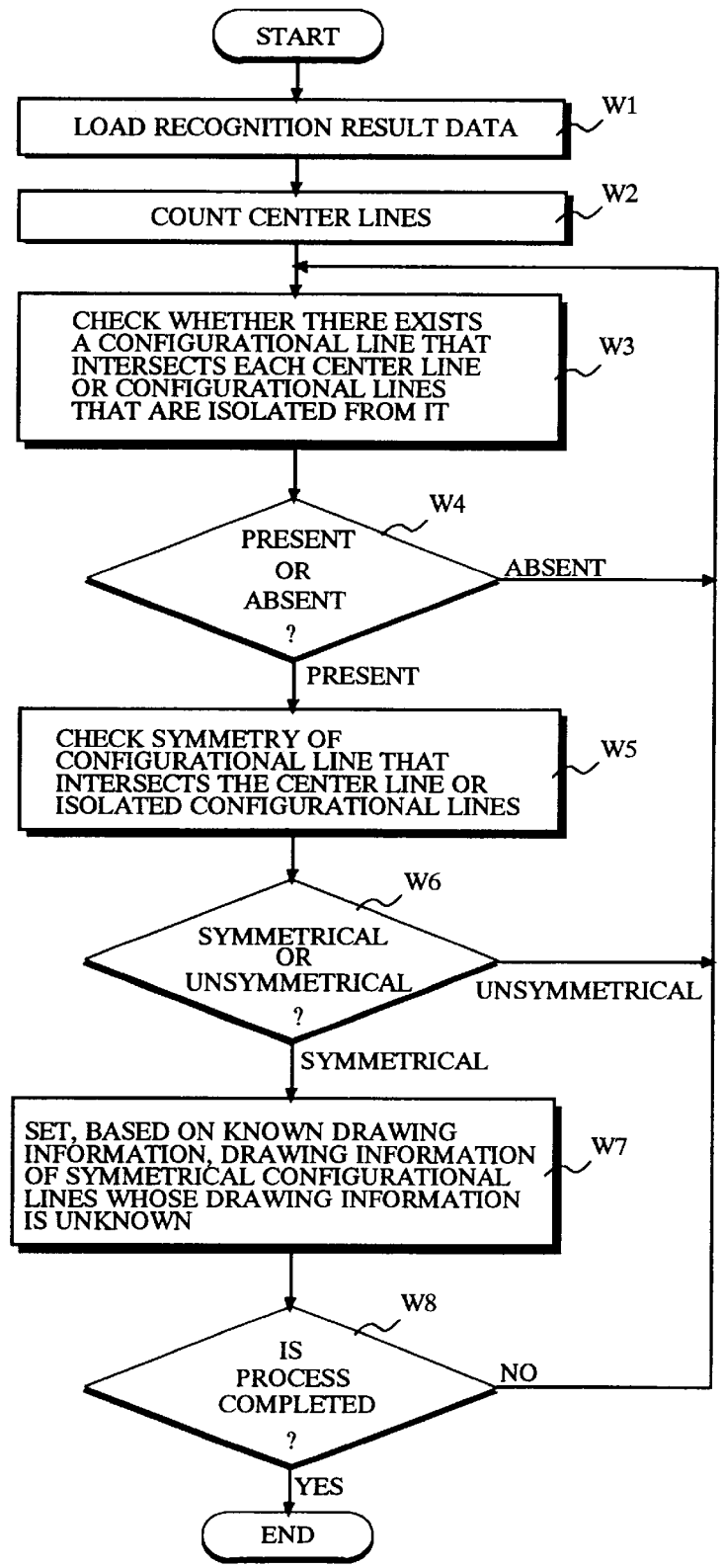
FIG. 2 is a flowchart showing a second conventional process.
Figure 3:
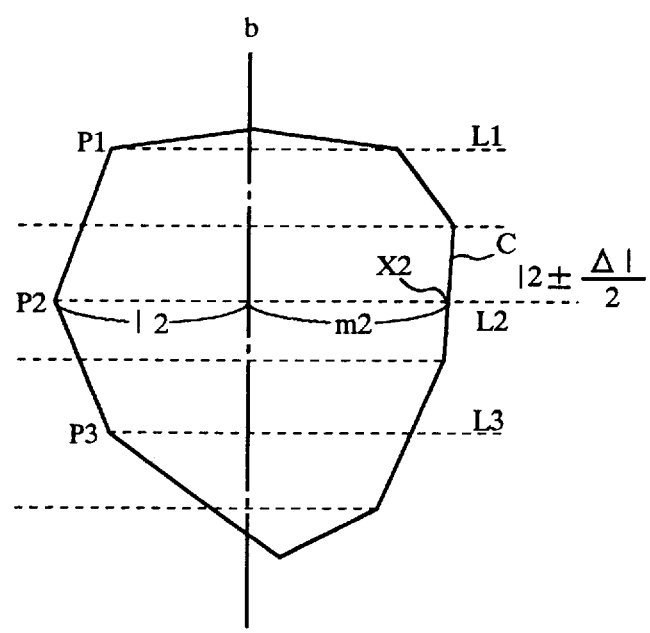
FIG. 3 illustrates a symmetry judging method of the second conventional method.
Figure 4:
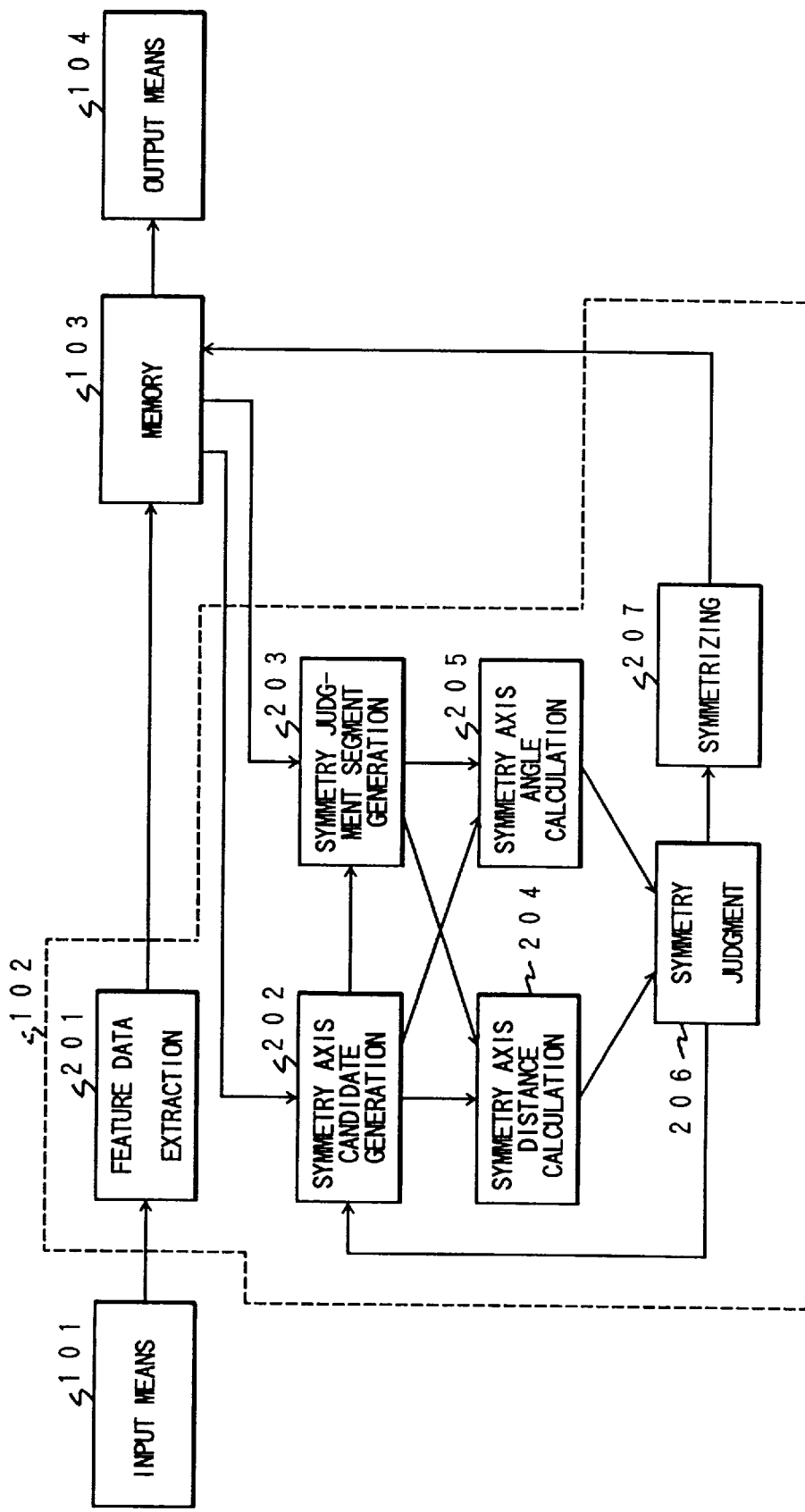
FIG. 4 is a functional block diagram showing a line-symmetrical figure shaping system according to a first embodiment of the present invention.

Referring to FIG. 4, a line-symmetrical figure shaping system according to a first embodiment of the invention is composed of the following components. An input means 101 allows a user to input a figure (e.g. a polygon) onto the screen of a display device through a keyboard or with a mouse, a pen, or the like. A data processing device 102 operates in program control. A memory 103 stores figure information and feature data. An output means 104 reproduces a figure based on the feature data, and supplies it to a display device (not shown). The data processing device 102, which is implemented as a DSP, for instance, has the following functions.

Feature data such as coordinates of apexes and lengths of sides are extracted from an input figure (feature data extraction 201), and stored onto the memory 103. All the symmetry axis candidates that will possibly become a symmetry axis of the figure are generated based on the feature data (symmetry axis candidate generation 202). The symmetry axis candidates are processed one by one in the following manner. To judge the symmetry of one symmetry axis candidates plural pairs of apexes are selected and a symmetry judgment segment that connects the apexes of each pair is generated (symmetry judgment segment generation 203). The distance between the middle point of the symmetry judgment segment and the symmetry axis candidate is calculated (symmetry axis distance calculation 204). Further, the angle formed by the symmetry judgment segment and the symmetry axis candidate is calculated, and its difference from 90° is calculated (symmetry axis angle calculation 205). Based on the distances and the angular differences that have been calculated for the respective symmetry judgment segments, it is judged whether the input figure is line-symmetrical with respect to the one symmetry axis candidate concerned (symmetry judgment 206). If the input figure is judged to be line-symmetrical, its feature data that are stored in the memory 103 are altered so as to represent a figure that is completely symmetrical with respect to the symmetry axis candidate (symmetrizing 207).

Figure 5:
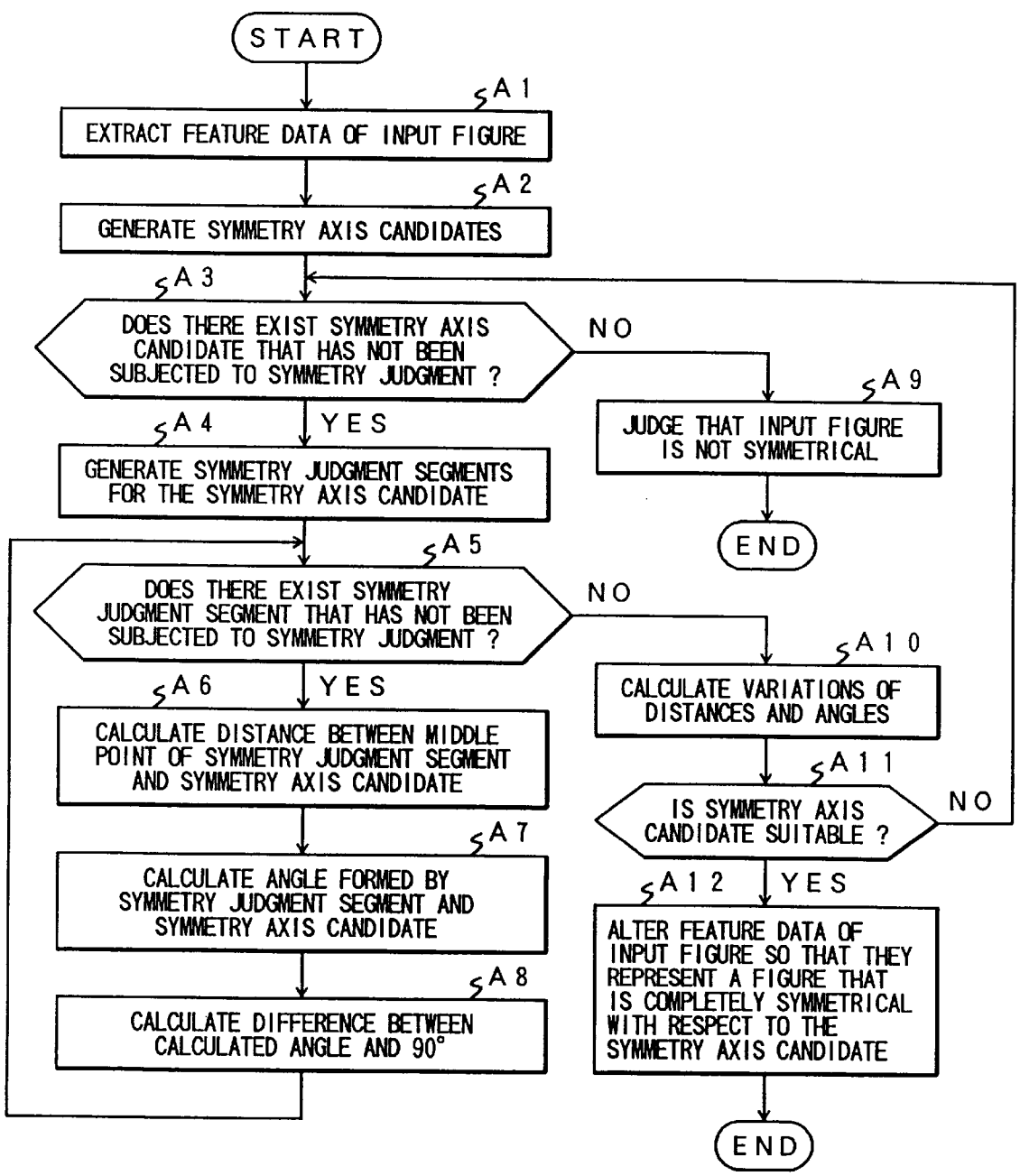
FIG. 5 is a flowchart showing an example of a process executed by a data processing device used in the first embodiment of the present invention.

Referring to FIG. 5, as in the case of an ordinary figure recognition tool, feature data such as coordinates of apexes, angles formed by adjacent sides, lengths of sides, and kinds of lines (straight line or curve) are extracted from an input figure by the input means 101 (step A1). The extracted feature data are stored in the memory 103 together with information of the input figure (e.g. triangle, rectangle, or the like).

Next, a symmetry axis candidate is generated in the manner described below from each of apexes and middle points of sides that a symmetry axis may pass through while the feature data of the figure stored in the memory 103 are referred to (step A2). For example, the following symmetry axis candidates are generated depending on the number of apexes of the input figure.

1) Where the number M of apexes is an odd number, M symmetry axis candidates in total are generated each of which connects an apex and the middle point of a side that is opposed to the apex.
2) Where the number M of apexes is an even number, M symmetry axis candidates are generated that consist of M/2 symmetry axis candidates each of which connects a pair of apexes opposed to each other and M/2 symmetry axis candidates each of which connects a pair of middle points of sides opposed to each other.

One symmetry axis candidate is selected from the above-generated candidates, and subjected to a symmetry judgment process described below.

First, apexes that are located on both sides of the selected symmetry axis candidate are traced in order from one apex (or middle point) to the other apex (or middle point) that the selected symmetry axis candidate passes through. The n-th apexes (n=1, 2, . . . ) are paired, and a line segment that passes through the pair of apexes is employed as a symmetry judgment segment (step A4). The symmetry axis distance calculation 204 and the symmetry axis angle calculation 205 are performed by sequentially using the symmetry judgment segments thus generated.

In this embodiment, as described above, a line segment connecting a pair of apexes is employed as a symmetry judgment segment, because this is suitable for an input figure that is a polygonal figure consisting of straight line segments. However, the invention is not limited to the use of such symmetry judgment segments, but may use symmetry judgment segments that are generated in a different way, as exemplified below. The middle points of sides located on both sides of a selected symmetry axis candidate are determined in order from one apex (or middle point) to the other apex (or middle point) that the selected symmetry axis candidate passes through. The n-th middle points (n=1, 2, . . . ) are paired, and a line segment that connects the pair of middle points is employed as a symmetry judgment segment. In another example, a figure line of one side from one apex (or middle point) to the other apex (or middle point) that the selected symmetry axis candidate passes through is equally divided into a predetermined number of parts. A figure line of the other side are also equally divided into the same number of parts. A line segment connecting each pair of corresponding dividing points on the two figure lines is employed as a symmetry judgment segment. These two methods are suitable for the symmetry judgment of an input figure that includes a curved segment such as a circular arc.

By the symmetry axis distance calculation 204, the coordinates of the middle point of the symmetry judgment segment are calculated, and then the distance between this middle point and the selected symmetry axis candidate is calculated (stop A6). The angle formed by the symmetry judgment segment and the selected symmetry axis candidate is calculated by the symmetry axis angle calculation 205 (step A7). Further, the difference (absolute value) between the calculated angle and 90° is calculated (step A8).

If the steps A6–A8 have been executed for all the symmetry judgment segments generated by the symmetry judgment segment generation 203 ("No" in step A5), respective variations of the distances and the angular differences are calculated by the symmetry judgment 206 (step A10). For example, the variations of the distances and the angular differences may be calculated by calculating averages or variances of the distances and angular differences. In cases w here averages or variances are used, the symmetry is judged to be higher as they are close to zero. When the variations of the distances and the angular differences are smaller than given thresholds, the symmetry judgment 206 judges that the input figure is symmetrical with respect to the selected symmetry axis candidate (step A11).

If the input figure is judged to be symmetrical ("Yes" in step A11), the feature data such as the coordinates of the apexes of the input figure which are stored in the memory 103 are altered so as to represent a figure that is completely symmetrical with respect to the selected symmetry axis candidate (step A12). That is, the input figure is shaped into a line-symmetrical figure by aligning the coordinates of the apexes on the predetermined side of the symmetry axis with the coordinates of the apexes on the opposite side. After completion of the shaping, the output means 104 reproduces the figure based on the altered feature data, and displays it on a display device.

On the other hand, when the input figure is judged to be not line-symmetrical with respect to the selected symmetry axis candidate ("No" in step A11), the next symmetry axis candidate is selected and steps A4–A11 are performed on the new symmetry axis candidate. If the input figure is judged to be not line-symmetrical for all the symmetry axis candidates ("No" in step A3), the input figure is finally judged to be not line-symmetrical (step A9) and the shaping is not performed.

According to the first embodiment, a symmetry axis is automatically extracted from a figure that is input by a user, and the input figure can be shaped into a figure that is line-symmetrical with respect to a single straight symmetry axis extending in an arbitrary direction.

A specific example of the first embodiment will be described to allow its clear understanding, in which the input figure is a pentagon shown in FIG. 6A.

Figure 6A:
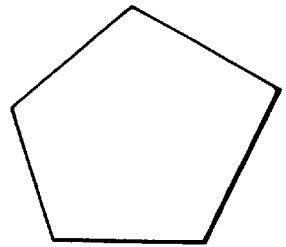
FIG. 6A shows an example of an input figure that is used to describe the operation of the first embodiment of the present invention.
Figure 6D:
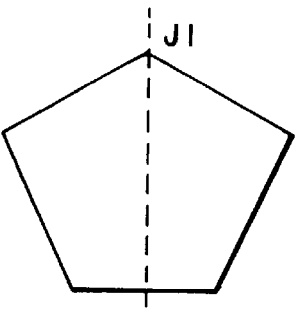
FIG. 6D shows a figure produced after the input figure is shaped for line-symmetrization.
Figure 6B:
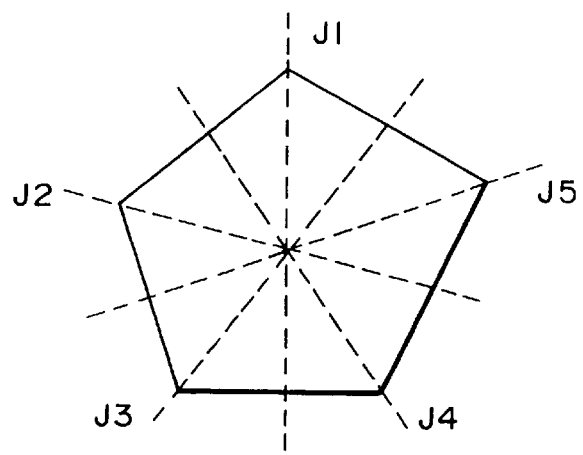
FIG. 6B shows an example of symmetry axis candidates generated by a symmetry axis candidate generating function.

If is assumed that a figure shown in FIG. 6A is input by a user through the input means 101. Feature data such as coordinates of apexes, lengths of sides, and kinds of the sides (straight line or curve) are extracted from the input figure, and stored in the memory 103 together with figure information (pentagon). At this time, the input figure itself is displayed on the display device of the output means 104. Next, five symmetry axis candidates J1–J5 shown in FIG. 6B are generated based on the apex coordinates of the feature data.

Figure 6C:
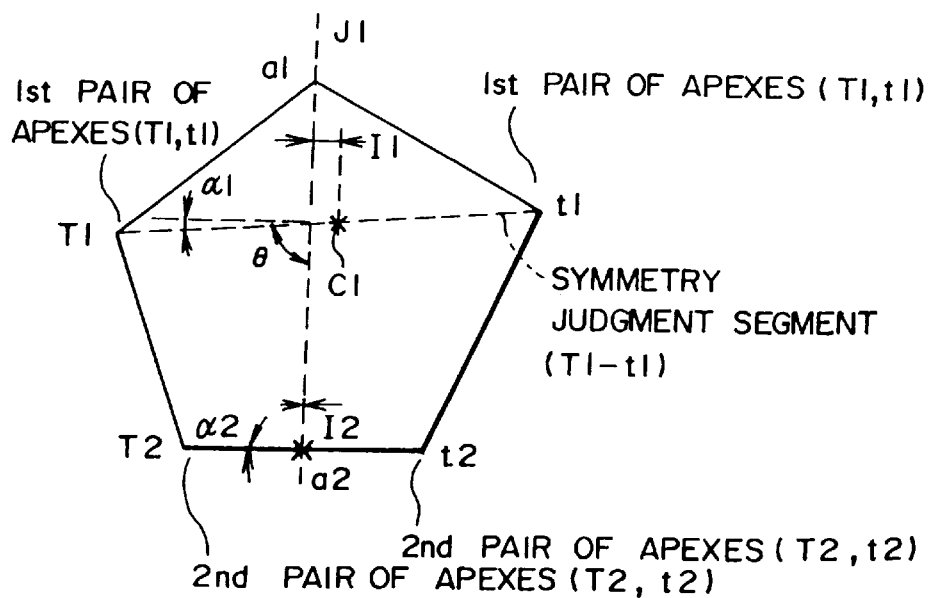
FIG. 6C shows a symmetry judgment segment, distances, and angles all of which are used in symmetry judgment.

First, the axis J1 is selected as a symmetry axis candidate for the symmetry judgment. As shown in FIG. 6C, the apexes on both sides of the symmetry axis candidate J1 are traced in turn from apex a1 to middle point a2 of the opposed side that the axis J1 passes through. In the course of this operation, a symmetry judgment segment T1-t1 is generated by connecting the first pair of apexes with a straight line, and a symmetry judgment segment T2-t2 is generated by connecting the second pair of apexes with a straight line. In this example, two symmetry judgment segments are generated.

Next, with respect to the symmetry judgment segment T1-t1, coordinates of middle point C1 of the segment T1-t1 and its distance I1 from the symmetry axis candidate J1 are calculated by the symmetry axis calculation 204. Angle θ formed by the symmetry judgment segment T1-t1 and the symmetry axis candidate J1 and its difference α1 from 90° are calculated by the symmetry axis angle calculation 205. Similarly, distance I2 and angular difference α2 are calculated for the symmetry judgment segment T2-t2. In the example of FIG. 6C, both I2 and α2 are zero.

Then, variations of distances I1 and I2 and angular differences α1 and α2 are calculated by the symmetry judgment 206. If it is assumed that I1=8, I2=0, α1=5, and α2=0, the average (i.e., variation) of I1 and I2 is 4 and the average of α1 and α2 is 2.5. If it is assumed that an input figure should be judged to be line-symmetrical with respect to the symmetry axis candidate concerned when the averages are smaller than a given value close to 0, for instance, 5, the input figure of FIG. 6A is judged to be line-symmetrical with respect to the selected symmetry axis candidate J1.

Therefore, the feature data such as the coordinates of the apexes of the input figure are corrected by the symmetrizing 207 so as to represent a figure that is completely line-symmetrical with respect to the symmetry axis candidate J1, and again stored into the memory 103. The figure thus generated is shaped as shown in FIG. 6D. In this example, the coordinates of the apexes on the right side of the symmetry axis candidate J1 are corrected with the coordinates of the apexes on the left side used as references. After completion of the shaping, the output means 104 displays on the display device the figure of FIG. 6D in place of the figure of FIG. 6A.

SECOND EMBODIMENT

Figure 7:
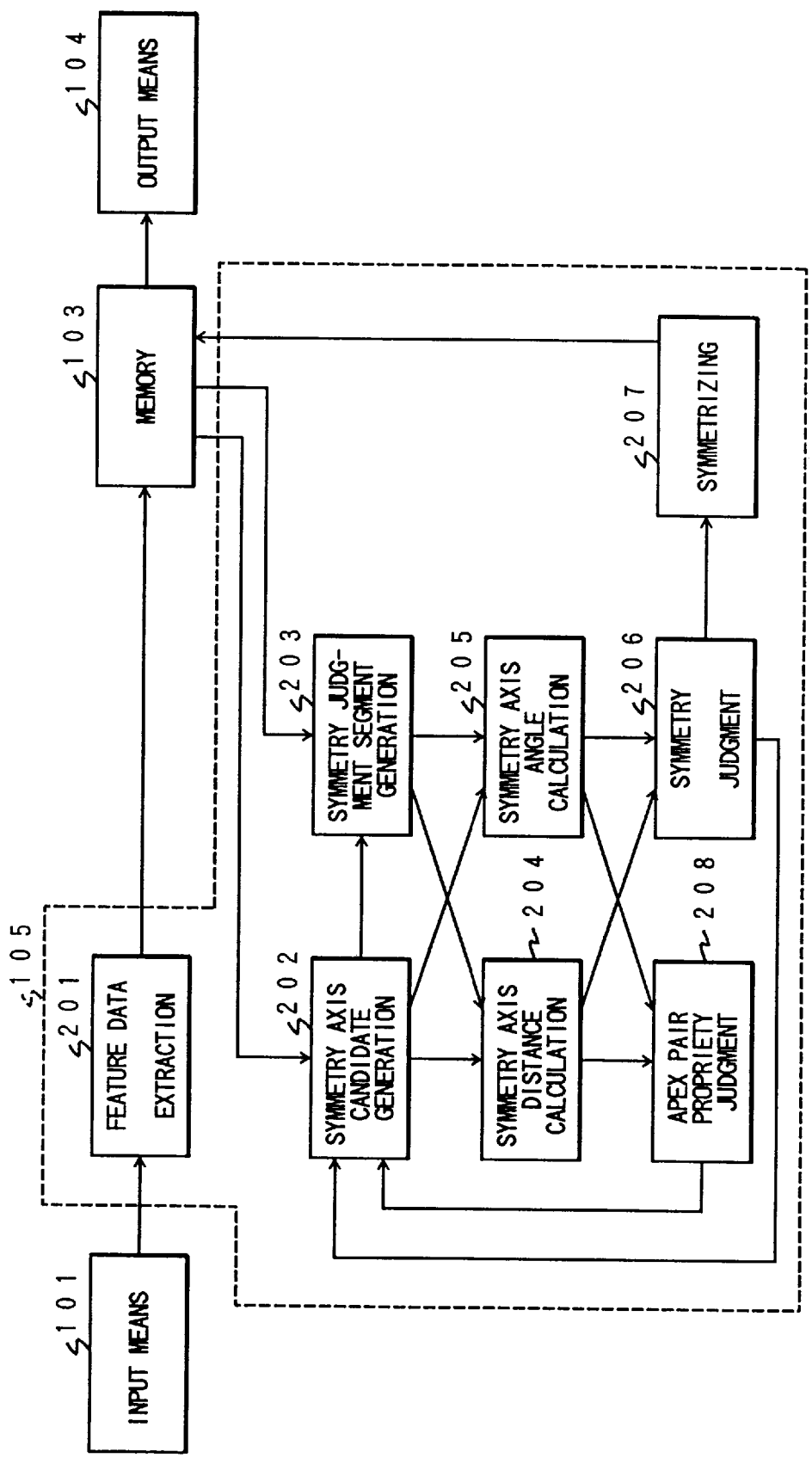
FIG. 7 is a functional block diagram showing a line-symmetrical figure shaping system according to a second embodiment of the present invention.

Referring to FIG. 7, in a second embodiment of the invention, a data processing device 105 is provided with a function of apex pair propriety judgment 208 is provided. Every time a distance and an angular difference are calculated for each symmetry judgment segment, the apex pair propriety judgment 208 compares those calculated values with predetermined thresholds. Thus, the apex pair propriety judgment 208 judges the symmetry with respect to the symmetry axis candidate for the symmetry judgment segment concerned. If the judgment is "unsymmetrical," the processing on the symmetry judgment segment concerned is stopped to start processing on the next symmetry judgment segment. Since the other functions 201–207 are the same as those in the first embodiment shown in FIG. 4, detailed descriptions therefor are omitted.

Figure 8:
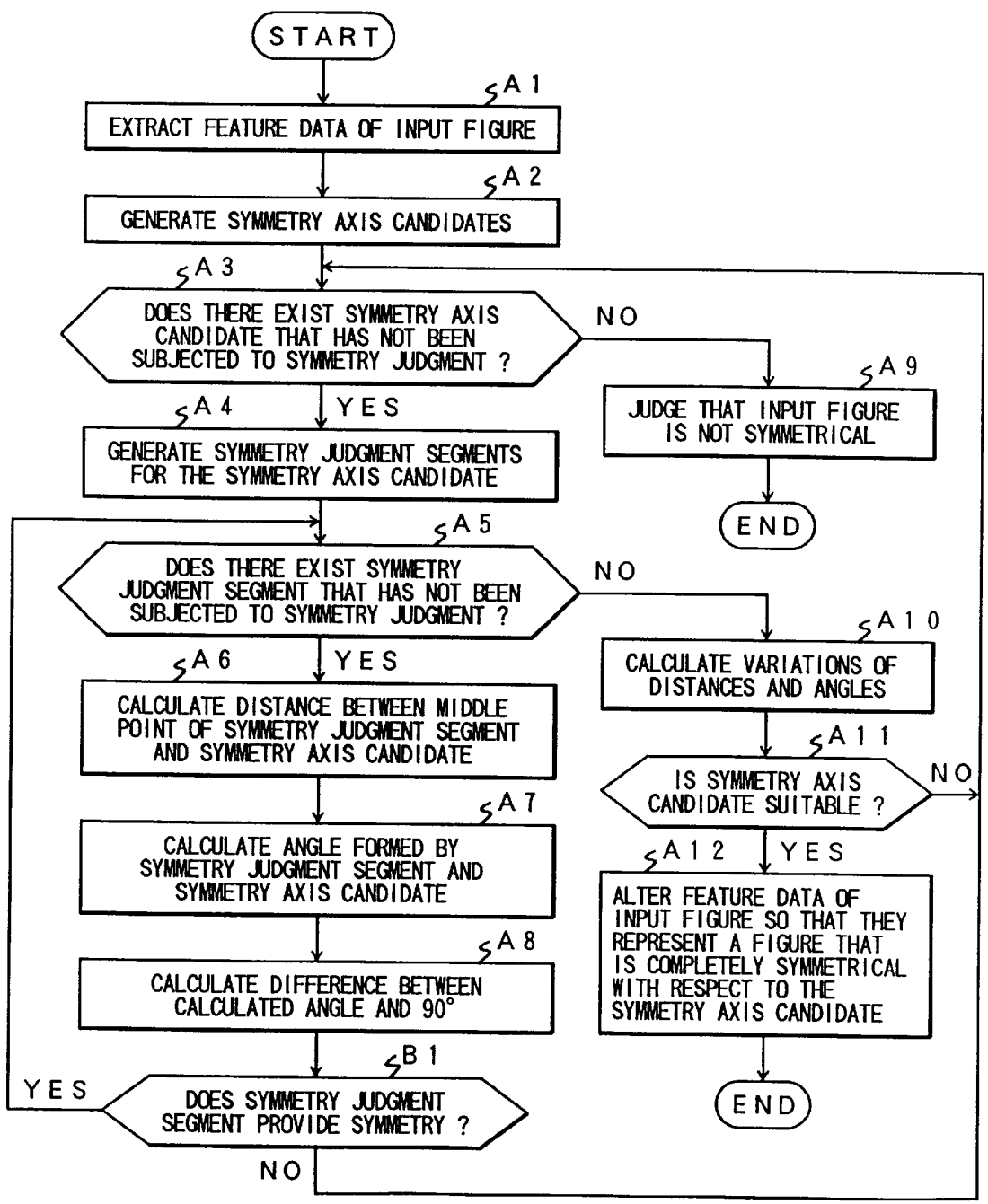
FIG. 8 is a flowchart showing an example of a process executed by a data processing device used in the second embodiment of the present invention.

Referring to FIG. 8, steps A1–A12 are the same as those in the first embodiment shown in FIG. 5. In the first embodiment, the propriety of one symmetry axis candidate is judged after the distances and the angular differences for all the symmetry judgment segments and the symmetry axis candidate concerned. In contrast, in the second embodiment, every time a distance and an angular difference are calculated for one symmetry judgment segment, it is judged whether the calculated distance and angular difference are smaller than respective given thresholds (step B1). If they are smaller than the given thresholds, the calculation of a distance and an angular difference is continued for the remaining symmetry judgment segments with a judgment that it is highly probable that the current symmetry judgment segment is symmetrical with the symmetry axis candidate concerned ("Yes" in step B1). On the other hand, if at least one of the distance and the angular difference exceeds the given threshold, the input figure is judged to be unsymmetrical with respect to the symmetry axis candidate concerned ("No" in step B1). In this case, the processing on the symmetry axis candidate concerned is stopped to start processing on the new symmetry axis candidate.

The second embodiment can provide faster processing speed than the first embodiment, because it can discard a symmetry axis candidate that does not provide symmetry at an early stage.

THIRD EMBODIMENT

Figure 9:
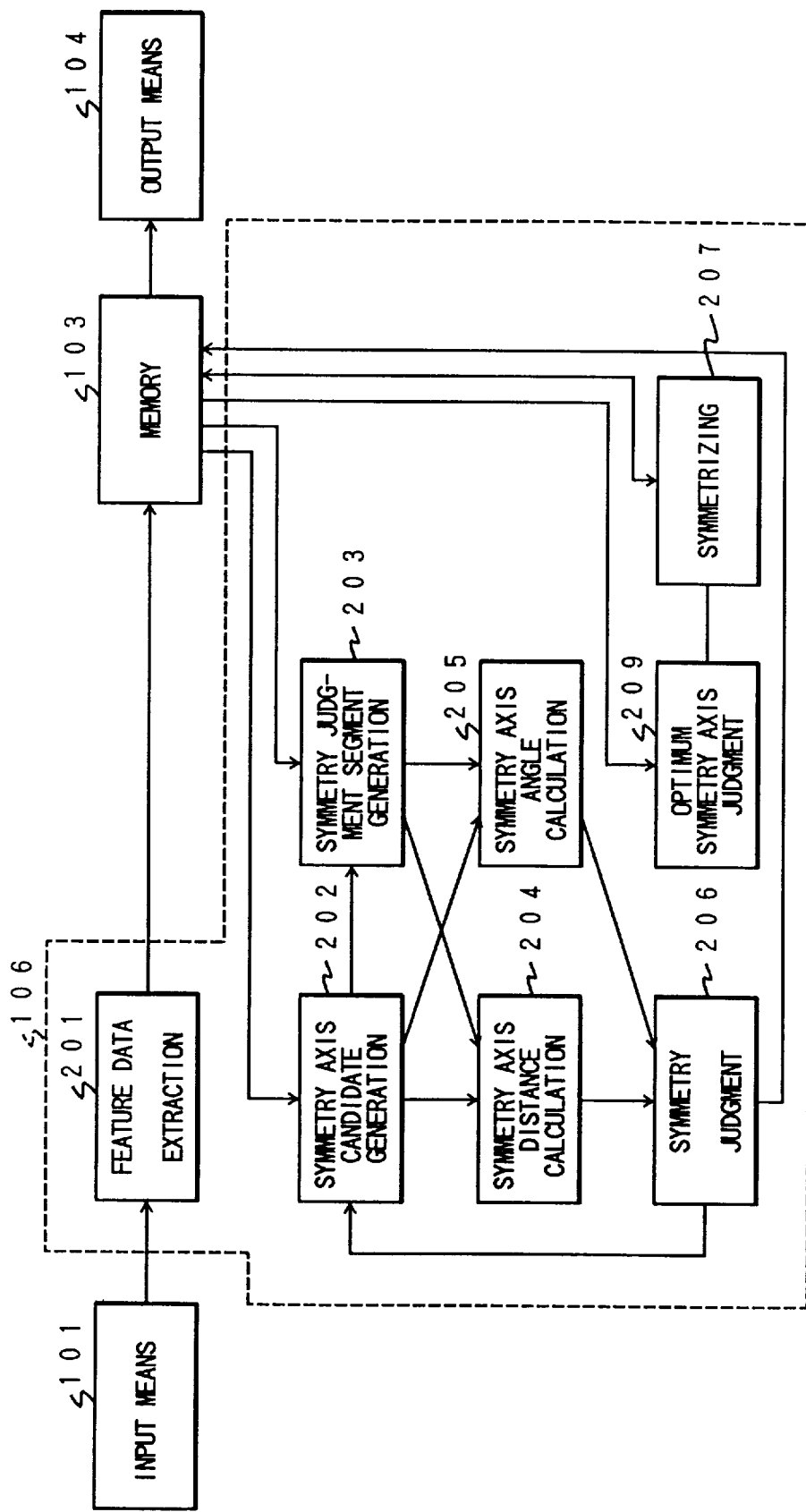
FIG. 9 is a functional block diagram showing a line-symmetrical figure shaping system according to a third embodiment of the present invention.

Referring to FIG. 9, in a third embodiment of the invention, a data processing device 106 is provided with a function of optimum symmetry axis judgment 209. Although the symmetry judgment 206 is performed on every symmetry axis candidate, it is not a final one. At a time point when the symmetry judgment 206 has been performed on all the symmetry axis candidates, the optimum symmetry axis judgment 209 selects, among the symmetry axis candidates that have been judged to provide symmetry, one symmetry axis candidate that provides the highest degree of symmetry. The symmetrizing 207 is performed by using the most appropriate symmetry axis thus selected. Since the other functions 201–207 are the same as those of the first embodiment shown in FIG. 4, descriptions therefor are omitted.

Figure 10:
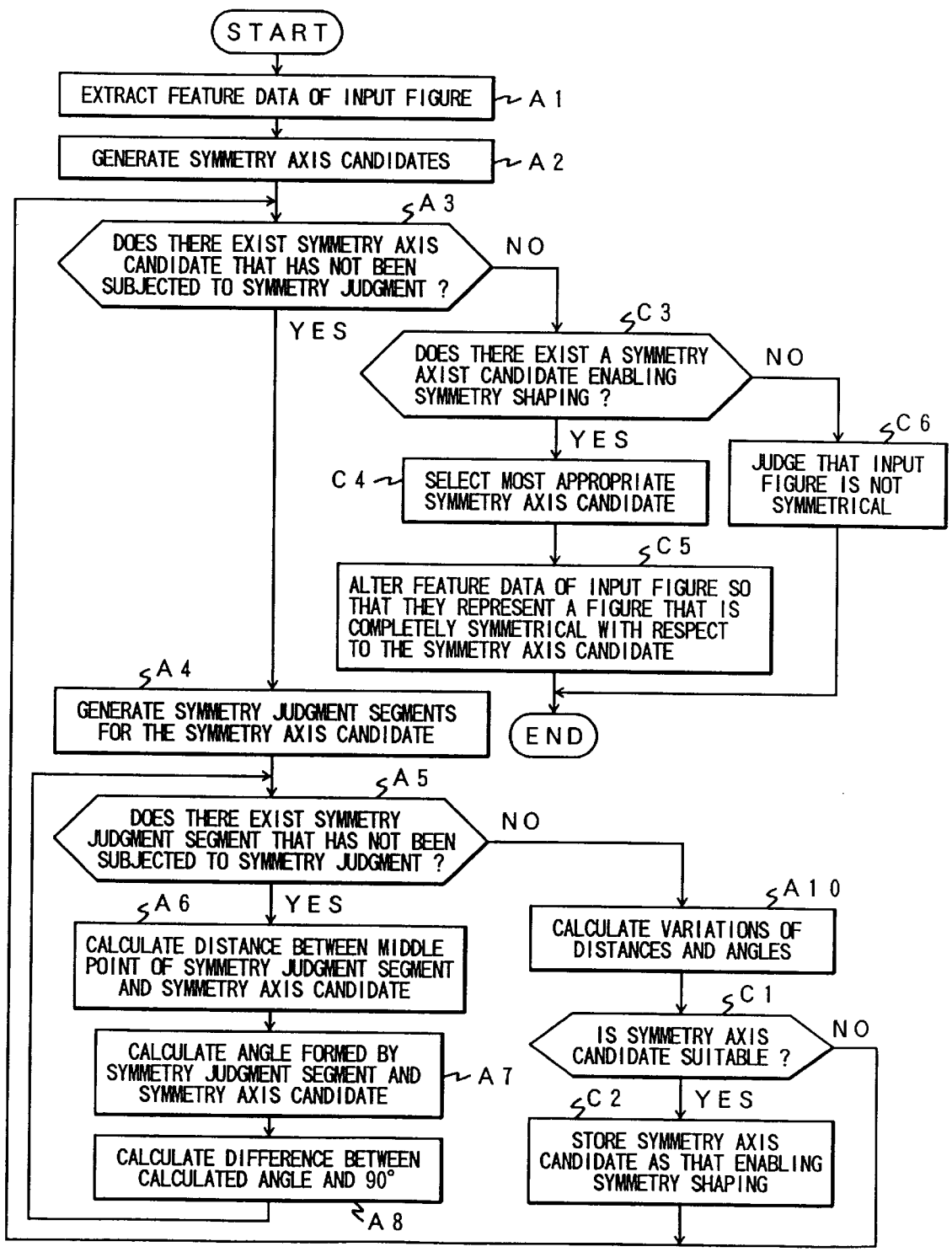
FIG. 10 is a flowchart showing an example of a process executed by a data processing device used in the third embodiment of the present invention.

Referring to FIG. 10, while steps A1–A8 and A10 are the same as those in the first embodiment shown in FIG. 5, steps C1–C6 are newly provided in this embodiment. The operation of the third embodiment will be described with reference to FIG. 10. However, detailed descriptions of steps A1–A10 will be omitted.

As described before, in the first embodiment, distances and angular differences are calculated between a certain symmetry axis candidate and respective symmetry judgment segments. If variations of the calculated distances and angular differences are within the given thresholds, the line-linearity shaping is immediately performed by using the symmetry axis candidate concerned.

In contrast, in the third embodiment, if the symmetry judgment 206 judges that the selected symmetry axis candidate provides symmetry ("Yes" in step C1), the variations in distance and angular difference that have been calculated for the selected symmetry axis candidate are stored into the memory 103. The symmetry axis candidate is also stored as a symmetry axis candidate enabling symmetry shaping (step C2).

After the symmetry judgment 206 has been performed for all the symmetry axis candidates ("No" in step A3), the optimum 44 symmetry axis judgment 209 checks whether a symmetry axis candidate enabling symmetry shaping is stored in the memory 103 (step C3). If there exists a symmetry axis candidate enabling symmetry shaping, a symmetry axis candidate providing the highest degree of symmetry is selected based on the variations in distance and angular difference (step C4). The symmetrizing 207 alters the feature data of the input figure so that they represent a figure that is completely line-symmetrical with respect to the selected symmetry axis candidate (step C5). If there exists no symmetry axis candidate enabling symmetry shaping ("No" in step C3), the input figure is judged to be unsymmetrical (step C6).

The third embodiment can produce a line-symmetrical figure that is closest to the input figure, because it can shape the input figure in connection with the symmetry axis providing the highest degree of symmetry.

FOURTH EMBODIMENT

Figure 11:
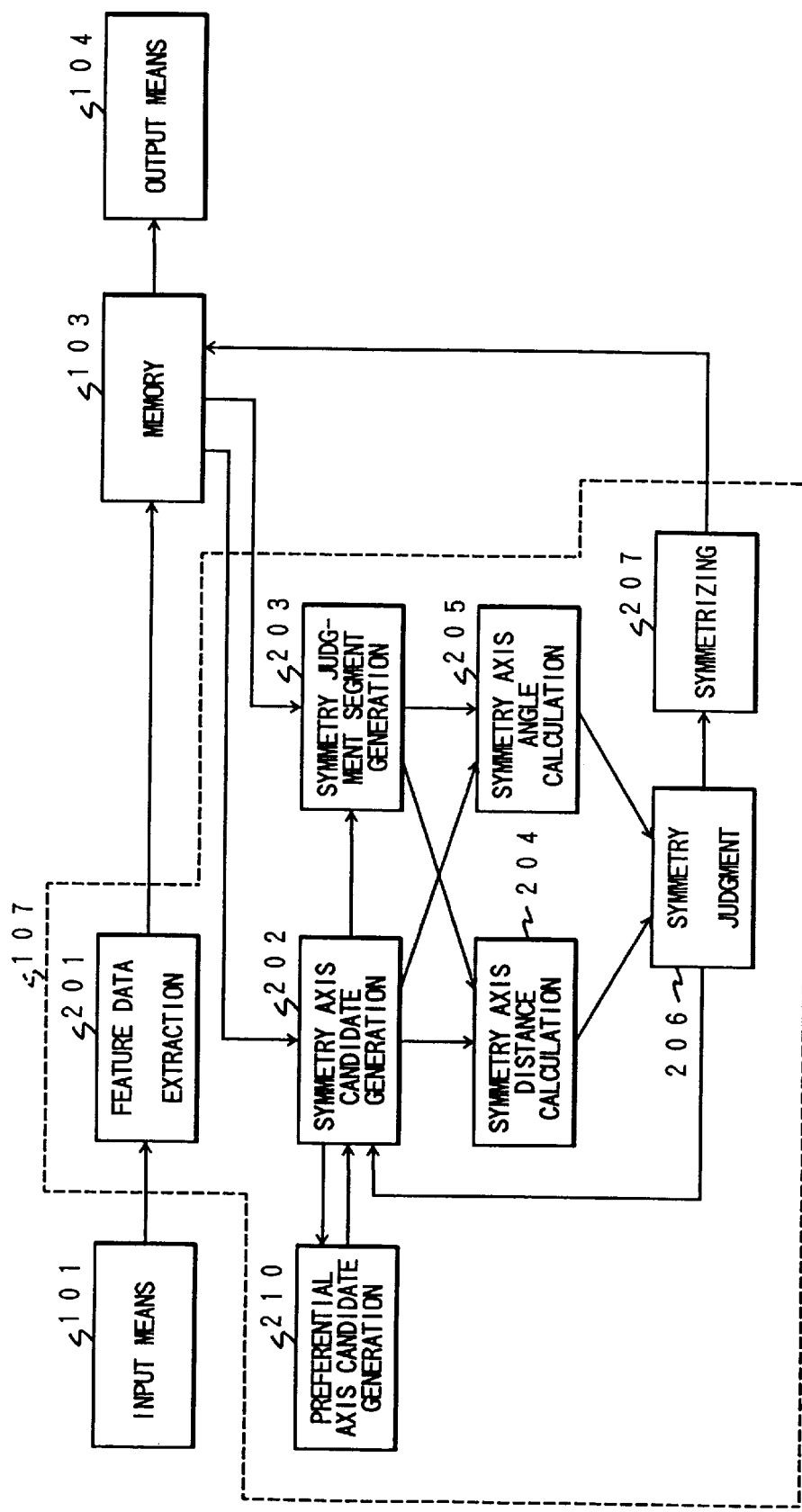
FIG. 11 is a functional block diagram showing a line-symmetrical figure shaping system according to a fourth embodiment of the present invention.

Referring to FIG. 11, in a fourth embodiment of the invention, a data processing device 107 is provided with a function of preferential axis candidate generation 210. The preferential axis candidate generation 210 judges whether symmetry axis candidates include a symmetry axis candidate that appears horizontal or vertical in a displayed picture of an input figure. If it is judged that there exists such a symmetry axis candidate, the processing order of the symmetry axis candidates is determined so that the horizontal or vertical symmetry axis candidate is processed with preference. Since the other functions 201–207 are the same as those of the first embodiment shown in FIG. 4, descriptions therefor are omitted.

Figure 12:
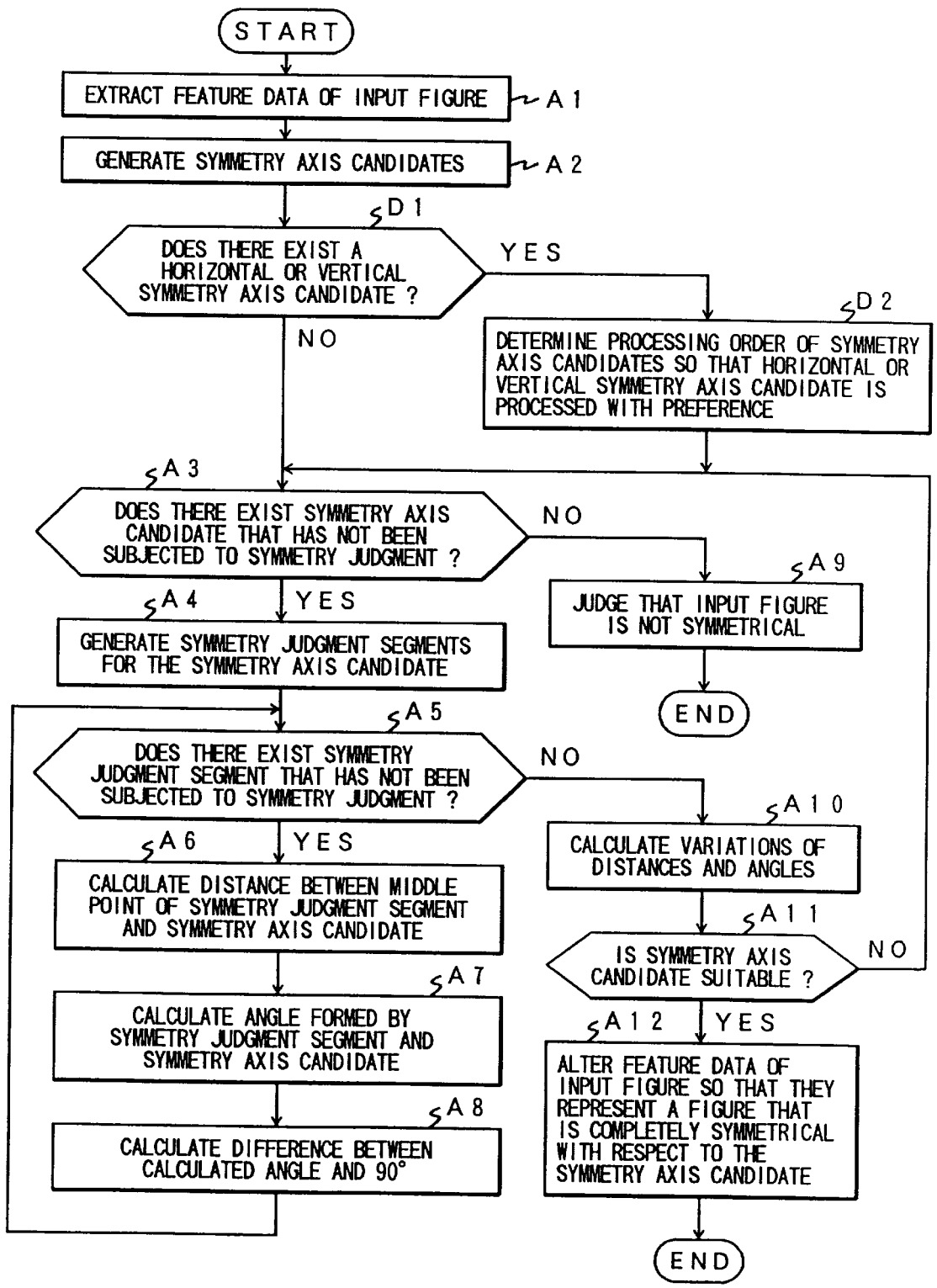
FIG. 12 is a flowchart showing an example of a process executed by a data processing device used in the fourth embodiment of the present invention.

In FIG. 12, while steps A1–A12 are the same as those of the first embodiment shown in FIG. 5, steps D1 and D2 are newly added in the fourth embodiment. The operation of this embodiment will be described with reference to FIG. 12. However, detailed descriptions of steps A1–A12 will be omitted.

Referring to FIG. 12, when all the symmetry axis candidates have been generated (step A2), the preferential axis candidate generation 210 judges whether the symmetry axis candidates include a symmetry axis candidate that appears horizontal or vertical in a displayed picture of the input figure (step D1). If there exists such a symmetry axis candidate, the processing order of the symmetry axis candidates is determined so that the horizontal or vertical symmetry axis candidate is processed with preference (step D2). As a result, step A4 and the following steps are performed with preference given to the horizontal or vertical symmetry axis candidate.

The fourth embodiment can easily produce a line-symmetrical figure having a horizontal or vertical symmetry axis by processing, with preference, a symmetry axis candidate that extends in the horizontal or vertical direction on the display screen. In general , in inputting a line-symmetrical figure by hand writing, a user tends to set a symmetry axis in the horizontal or vertical direction. Therefore, this embodiment can efficiently detect such a symmetry axis and shape the input figure into a figure as desired by the user.

FIFTH EMBODIMENT

Figure 13:
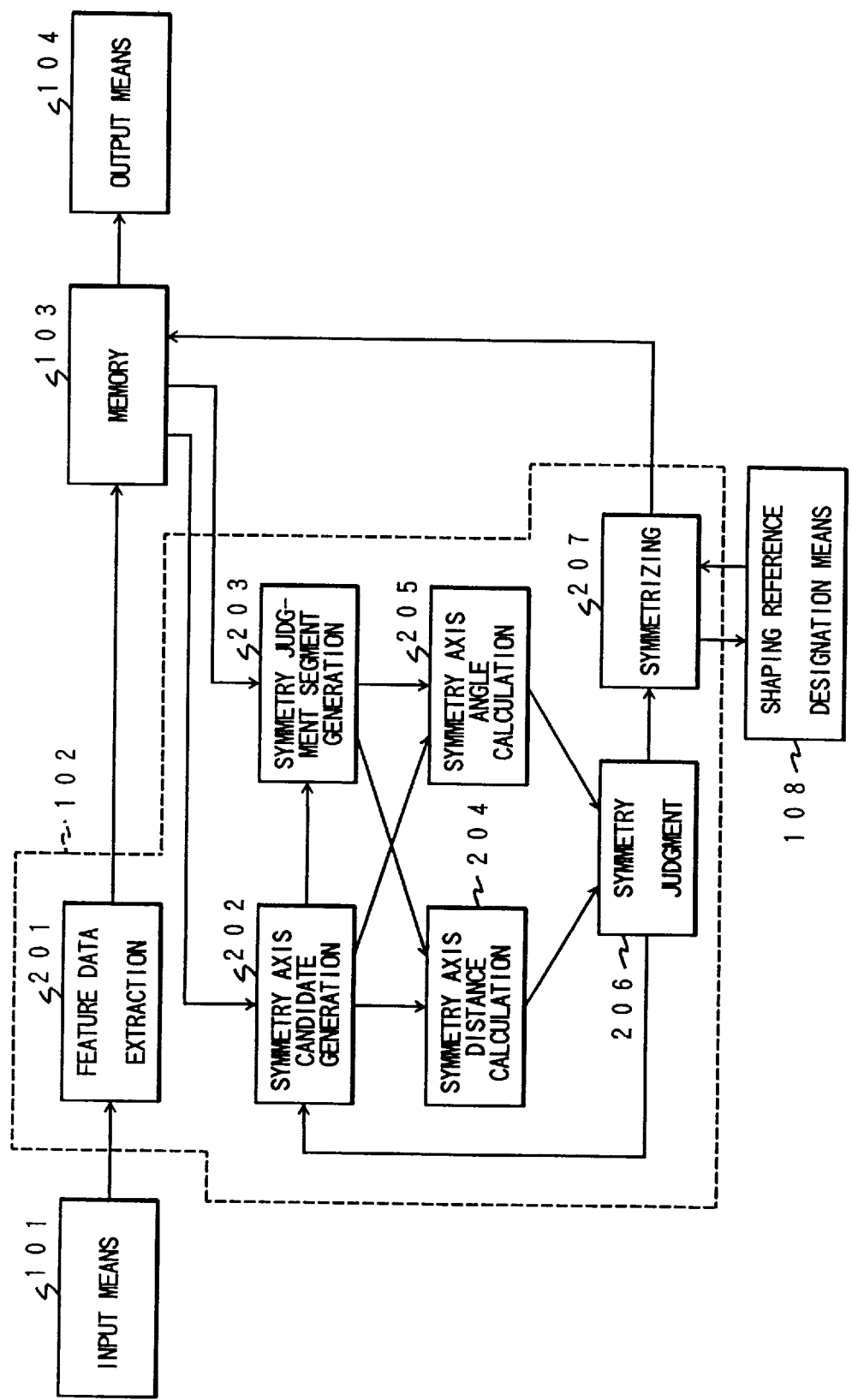
FIG. 13 is a functional block diagram showing a line-symmetrical figure shaping system according to a fifth embodiment of the present invention.

Referring to FIG. 13, a fifth embodiment of the invention is different from the first embodiment shown in FIG. 4 in additionally having a shaping reference designation means 108. When the symmetrizing 207 shapes an input figure using a symmetry axis obtained by the symmetry judgment 206, the shaping reference designation means 108 receives a reference element for shaping from a user and informs the symmetrizing 207 of the received element.

Figure 14:
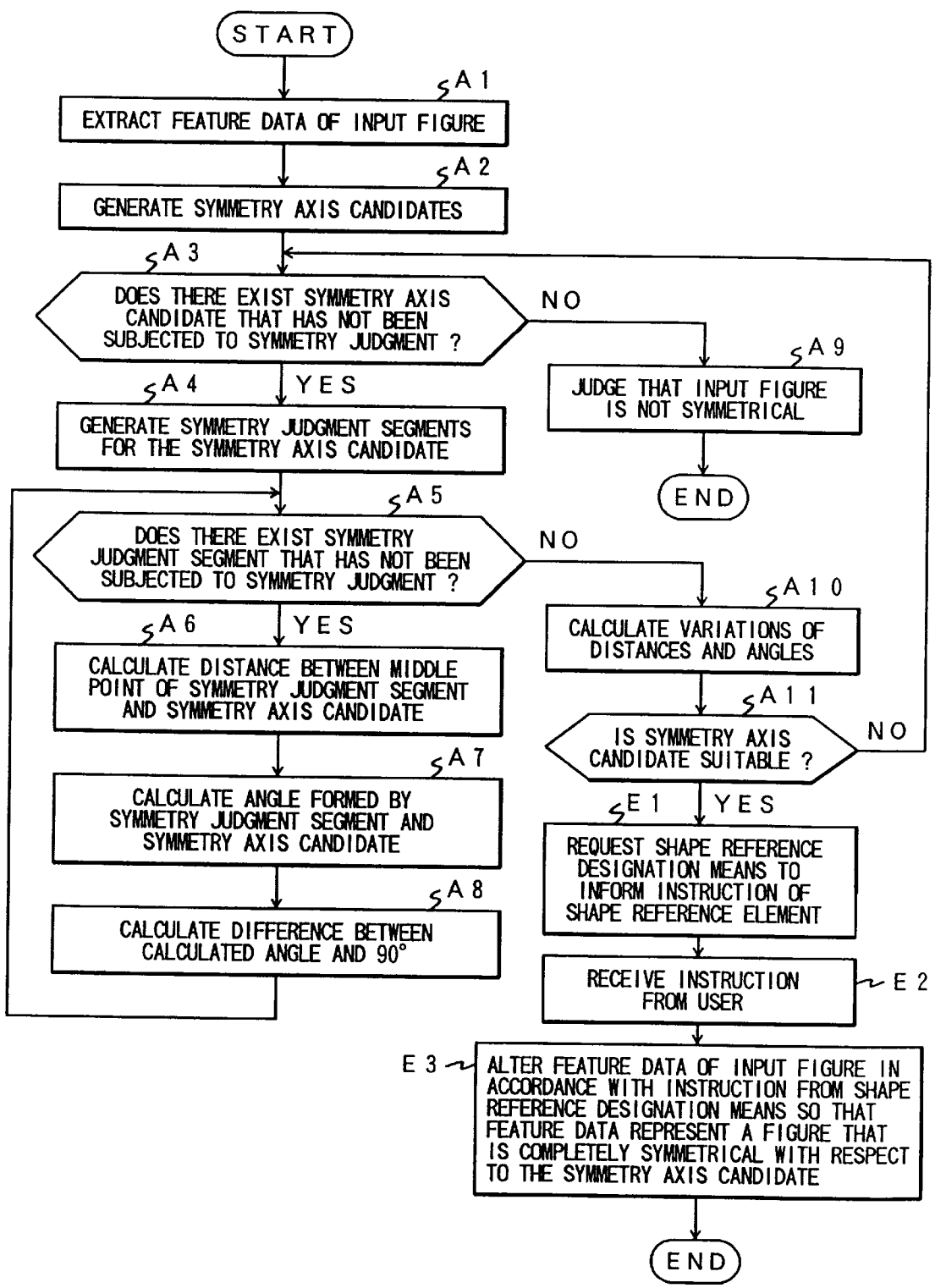
FIG. 14 is a flowchart showing an example of a process executed by a data processing device used in the fifth embodiment of the present invention.

In FIG. 14, while steps A1–A11 are the same as those in the first embodiment shown in FIG. 5, the fifth embodiment is different from the first embodiment in having steps E1–E3. The operation of this embodiment will be described with reference to FIG. 14.

Referring to FIG. 14, upon reception of symmetry axis candidates enabling symmetry shaping from the symmetry judgment 206, the symmetrizing 207 requests the shape reference designation means 108 to inform a reference element for shaping (step E1). Upon reception of the above request, the shape reference designation means 108 receives an instruction of a shape reference element from a user and informs the symmetrizing 207 of the received instruction (step E2). A shaping reference element may be designated in the following manner. For example, while the symmetry axis concerned is temporarily displayed on the display device so as to be superimposed on the input figure, a user is requested to specify, through a keyboard or with a mouse or the like, an apex or side on which side (right or left, or upper or lower) should be used as a reference.

The symmetrizing 207 shapes the figure in accordance with the instruction from the shape reference designation means 108 (Step E3). Alternatively, the shape reference designation means 108 may be provided with a random number generator (not shown). More specifically, the symmetrization is performed by the symmetrizing function 207 according to a designation instruction selected from predetermined designation instructions depending on a random number generated by the random number generator. The designation instruction is directed to one of right side and left side, or averaging of the coordinates of the both sides, for instance, according to the random number. The fifth embodiment can shape an input figure into a line-symmetrical figure that more conforms to a users intention, because it allows designation of a reference for shaping of the symmetrizing.

While the invention has been described above by way of several embodiments, the invention is not limited to those embodiments but various additions and modifications are possible as exemplified below.

A system may be constructed by adding, to the first embodiment (FIG. 4), an arbitrary combination of the apex pair propriety judgment 208 (FIG. 7), the preferential axis candidate generation 210 (FIG. 11), and the shape reference designation means 108 (FIG. 13).

Further, a system may be constructed by adding, to the third embodiment (FIG. 9), an arbitrary combination of the apex pair propriety judgment 208 (FIG. 7), the preferential axis candidate generation 210 (FIG. 11), and the shape reference designation means 108 (FIG. 13). In the case of adding the preferential axis candidate generation 210, the optimum symmetry axis judgment 209 is adapted to select a symmetry axis candidate providing the highest degree of symmetry from symmetry axis candidates, if any, that appear horizontal or vertical on the display screens, or from all available symmetrical axis candidates if there is no horizontal or vertical symmetrical axis candidate.

The above-described line-symmetrical figure shaping systems according to the invention can provide the following advantages.

In the invention, all the symmetry axis candidates that will possibly become a symmetry axis of an input figure are generated from feature data such as coordinates of apexes of the input figure, a single symmetry axis candidate to become an actual symmetry axis is determined from those candidates, and the input figure is shaped into a completely symmetrical figure by using the symmetry axis thus determined. Therefore, an arbitrary figure that has been drawn by a user without considering its symmetry axis can be automatically shaped into a figure that is line-symmetrical with respect to a single straight symmetry axis.

If the shaping is performed by using, as a symmetry axis, a symmetry axis candidate that is first judged to provide line symmetry, fast processing can be realized. Further, if asymmetry axis candidate that appears horizontal or vertical on the display screen is processed with preference, a figure that is line-symmetrical with respect to that symmetry axis candidate can be generated efficiently with preference given thereto.

If the shaping is performed by selecting the most suitable symmetry axis candidate as a symmetry axis, a line-symmetrical figure that is closest to an input figure can be obtained. If the preferential axis candidate judgment function is added to this configuration, a figure that is line-symmetrical with respect to a symmetry axis candidate, if any, that appears horizontal or vertical on the display screen can be generated with preference.

The configuration having the apex pair propriety judgment function enables faster processing, because it can discard symmetry axis candidates not providing symmetry at an early stage.

Finally, the configuration having the shape reference designation means can provide a line-symmetrical figure that more conform to a user's intention.

What is claimed is:

1. A method for shaping an input figure into a line-symmetrical figure, comprising the steps of;
    a) extracting feature data from the input figure, the feature data including position data of apexes of the input figure;
    b) generating symmetry axis candidates based on the feature data, each of the symmetry axis candidates passing through at least one of the apexes and middle points of sides forming the input figure;
    c) generating symmetry axis judgment segments each connecting each of pairs of points on the input figure on both sides of a symmetry axis candidate selected one by one from the symmetry axis candidates;
    d) calculating distance differences between the symmetry axis candidate and middle points of the symmetry judgment segments, respectively;
    e) calculating angular differences between a right angle and angles which the symmetry judgment segments form with the symmetry axis candidate, respectively;
    f) judging whether the input figure is symmetrical with respect to the symmetry axis candidate based on the distance differences and the angular differences; and
    g) shaping the input figure such that the input figure becomes completely line-symmetrical with respect to the symmetry axis candidate when the symmetry axis candidate is judged to provide line symmetry.

2. The method according to claim 1, wherein the step (b) comprises the steps of:
    generating line segments as the symmetry axis candidates when the number of apexes of the input figure is an odd number such that each of the line segments connects an apex and a middle point of a side which is opposed to the apex; and
    generating a combination of first line segments and second line segments as the symmetry axis candidates when the number of apexes of the input figure is an even number such that each of the first line segments connects a pair of apexes opposed to each other and each of the second line segments connects a pair of middle points of sides opposed to each other.

3. The method according to claim 2, wherein the step (c) comprises the steps of:
    selecting a symmetry axis candidate one by one from the symmetry axis candidates;
    generating pairs of apexes that are located on both sides of the symmetry axis candidate from one intersection point to the other intersection point where the symmetry axis candidate intersects the input figure; and
    generating straight line segments as the symmetry axis judgment segments such that the straight line segments connect the pairs of apexes, respectively.

4. The method according to claim 1, wherein the step (f) comprises the steps of:
    calculating a first average of the distance differences and a second average of the angular differences; and
    judging the input figure to be symmetrical with respect to the symmetry axis candidate when each of the first and second averages falls within a predetermined range.

5. The method according to claim 1, wherein the step (f) comprises the steps of:
    calculating a first variance of the distance differences and a second variance of the angular differences; and
    judging the input figure to be symmetrical with respect to the symmetry axis candidate when each of the first and second variances falls within a predetermined range.

6. The method according to claim 1, wherein the step (g) comprises the step of:
    changing the feature data so as to correct the apex positions on one side of the symmetry axis candidate to those on the other side when the symmetry axis candidate is judged to provide line symmetry.

7. The method according to claim 1, wherein a first symmetry axis candidate which is first judged to provide symmetry is used to shape the input figure.

8. The method according to claim 2, wherein a first symmetry axis candidate which is first judged to provide symmetry is used to shape the input figure.

9. The method according to claim 3, wherein a first symmetry axis candidate which is first judged to provide symmetry is used to shape the input figure.

10. The method according to claim 1, wherein the step (c) comprises the steps of:

judging whether the symmetry axis candidates include at least one of a horizontal symmetry axis candidate and a vertical symmetry axis candidate which appear horizontal and vertical on screen, respectively;

selecting one of the horizontal symmetry axis candidate and the vertical symmetry axis candidate as the symmetry axis candidate with preference;

generating pairs of apexes that are located on both sides of the symmetry axis candidate from one intersection point to the other intersection point where the symmetry axis candidate intersects the input figure; and generating straight line segments as the symmetry axis judgment segments such that the straight line segments connect the pairs of apexes, respectively.

11. The method according to claim 1, wherein:

the step (f) comprises the steps of:

judging whether each of the symmetry axis candidates enables symmetry shaping of the input figure based on the distance differences and the angular differences; and selecting an optimum symmetry axis candidate from symmetry axis candidates which are judged to enable symmetry shaping of the input figure according to variations of the distance differences and the angular differences, and the step (g) comprises the step of:

shaping the input figure such that the input figure becomes completely line-symmetrical with respect to the optimum symmetry axis candidate.

12. The method according to claim 11, wherein:

the step (f) comprises the steps of:

calculating a first average of the distance differences and a second average of the angular differences for each of the symmetry axis candidates;

judging whether each of the symmetry axis candidates enables symmetry shaping of the input figure when each of the first and second averages falls within a predetermined range; and selecting an optimum symmetry axis candidate from symmetry axis candidates which are judged to enable symmetry shaping of the input figure according to variations of the first and second averages, and the step (g) comprises the step of:

shaping the input figure such that the input figure becomes completely line-symmetrical with respect to the optimum symmetry axis candidate.

13. The method according to claim 11, wherein:

the step (f) comprises the steps of:

calculating a first variance of the distance differences and a second variance of the angular differences for each of the symmetry axis candidates;

judging whether each of the symmetry axis candidates enables symmetry shaping of the input figure when each of the first and second variances falls within a predetermined range; and selecting an optimum symmetry axis candidate from symmetry axis candidates which are judged to enable symmetry shaping of the input figure according to variations of the first and second variances, and the step (g) comprises the step of:

shaping the input figure such that the input figure becomes completely line-symmetrical with respect to the optimum symmetry axis candidate.

14. The method according to claim 11, wherein the step (g) comprises the step of:

changing the feature data so as to correct the apex positions on one side of the optimum symmetry axis candidate to those on the other side.

15. The method according to claim 11, wherein the step (c) comprises the steps of:

judging whether the symmetry axis candidates include at least one of a horizontal symmetry axis candidate and a vertical symmetry axis candidate which appear horizontal and vertical on screen, respectively;

selecting one of the horizontal symmetry axis candidate and the vertical symmetry axis candidate as the symmetry axis candidate with preference;

generating pairs of apexes that are located on both sides of the symmetry axis candidate from one intersection point to the other intersection point where the symmetry axis candidate intersects the input figure; and generating straight line segments as the symmetry axis judgment segments such that the straight line segments connect the pairs of apexes, respectively.

16. A method for shaping an input figure into a line-symmetrical figure, comprising the steps of:

a) extracting feature data from the input figure, the feature data including position data of apexes of the input figure;

b) generating symmetry axis candidates based on the feature data, each of the symmetry axis candidates passing through at least one of the apexes and middle points of sides forming the input figure;

c) generating symmetry axis judgment segments each connecting each of pairs of points on the input figure on both sides of a symmetry axis candidate one by one selected from the symmetry axis candidates;

d) calculating a distance difference between the symmetry axis candidate and a middle point of a symmetry judgment segment sequentially selected from the symmetry axis judgment segments;

e) calculating an angular difference between a right angle and an angle which the symmetry judgment segment forms with the symmetry axis candidate;

f) judging whether each of the distance difference and the angular difference falls within a predetermined range;

g) storing the distance difference and the angular difference for the symmetry judgment segment when each of the distance difference and the angular difference falls within the predetermined range, and otherwise going back to the step (c) with selecting a next symmetry axis candidate;

h) repeating the steps (d) to (g) until all the symmetry judgment segments been selected;

i) judging whether the input figure is symmetrical with respect to the symmetry axis candidate based on both distance differences and angular differences which are stored by the step (g) when all the symmetry judgment segments have been selected; and j) shaping the input figure such that the input figure becomes completely line-symmetrical with respect to the symmetry axis candidate when the symmetry axis candidate is judged to provide line symmetry.

17. The method according to claim 16, wherein the step (b) comprises the steps of;

generating line segments as the symmetry axis candidates when the number of apexes of the input figure is an odd number such that each of the line segments connects an apex and a middle point of a side which is opposed to the apex; and generating a combination of first line segments and second line segments as the symmetry axis candidates when the number of apexes of the input figure is an even number such that each of the first line segments connects a pair of apexes opposed to each other and each of the second line segments connects a pair of middle points of sides opposed to each other.

18. The method according to claim 17, wherein the step (c) comprises the steps of:

selecting a symmetry axis candidate one by one from the symmetry axis candidates;

generating pairs of apexes that are located on both sides of the symmetry axis candidate from one intersection point to the other intersection point where the symmetry axis candidate intersects the input figure; and generating straight line segments as the symmetry axis judgment segments such that the straight line segments connect the pairs of apexes, respectively.

19. The method according to claim 16, wherein the step (i) comprises the steps of;

calculating a first average of the distance differences and a second average of the angular differences; and judging the input figure to be symmetrical with respect to the symmetry axis candidate when each of the first and second averages fails within a predetermined range.

20. The method according to claim 16, wherein the step (i) comprises the steps of:

calculating a first variance of the distance differences and a second variance of the angular differences; and judging the input figure to be symmetrical with respect to the symmetry axis candidate when each of the first and second variances falls within a predetermined range.

21. The method according to claim 16, wherein the step (j) comprises the step of:

changing the feature data so as to correct the apex positions on one side of the symmetry axis candidate to those on the other side when the symmetry axis candidate is judged to provide line symmetry.

22. The method according to claim 16, wherein a first symmetry axis candidate which is first judged to provide symmetry is used to shape the input figure.

23. The method according to claim 16, wherein the step (c) comprises the steps of:

judging whether the symmetry axis candidates include at least one of a horizontal symmetry axis candidate and a vertical symmetry axis candidate which appear horizontal and vertical on screen, respectively;

selecting one of the horizontal symmetry axis candidate and the vertical symmetry axis candidate as the symmetry axis candidate with preference;

generating pairs of apexes that are located on both sides of the symmetry axis candidate from one intersection point to the other intersection point where the symmetry axis candidate intersects the input figure; and generating straight line segments as the symmetry axis judgment segments such that the straight line segments connect the pairs of apexes, respectively.

24. The method according to claim 16, wherein:

the step (i) comprises the steps of:

judging whether each of the symmetry axis candidates enables symmetry shaping of the input figure based on the distance differences and the angular differences; and selecting an optimum symmetry axis candidate from symmetry axis candidates which are judged to enable symmetry shaping of the input figure according to variations of the distance differences and the angular differences, and the step (j) comprises the step of:

shaping the input figure such that the input figure becomes completely line-symmetrical with respect to the optimum symmetry axis candidate.

25. The method according to claim 24, wherein:

the step (i) comprises the steps of:

calculating a first average of the distance differences and a second average of the angular differences for each of the symmetry axis candidates;

judging whether each of the symmetry axis candidates enables symmetry shaping of the input figure when each of the first and second averages falls within a predetermined range; and selecting an optimum symmetry axis candidate from symmetry axis candidates which are judged to enable symmetry shaping of the input figure according to variations of the first and second averages, and the step (j) comprises the step of:

shaping the input figure such that the input figure becomes completely line-symmetrical with respect to the optimum symmetry axis candidate.

26. The method according to claim 24, wherein:

the step (i) comprises the steps of:

calculating a first variance of the distance differences and a second variance of the angular differences for each of the symmetry axis candidates;

judging whether each of the symmetry axis candidates enables symmetry shaping of the input figure when each of the first and second variances falls within a predetermined range; and selecting an optimum symmetry axis candidate from symmetry axis candidates which are judged to enable symmetry shaping of the input figure according to variations of the first and second variances, and the step (j) comprises the step of:

shaping the input figure such that the input figure becomes completely line-symmetrical with respect to the optimum symmetry axis candidate.

27. The method according to claim 24, wherein the step (j) comprises the step of:

changing the feature data so as to correct the apex positions on one side of the optimum symmetry axis candidate to those on the other side.

28. The method according to claim 24, wherein the step (c) comprises the steps of:

judging whether the symmetry axis candidates include at least one of a horizontal symmetry axis candidate and a vertical symmetry axis candidate which appear horizontal and vertical on screen, respectively;

selecting one of the horizontal symmetry axis candidate and the vertical symmetry axis candidate as the symmetry axis candidate with preference;

generating pairs of apexes that are located on both sides of the symmetry axis candidate from one intersection point to the other intersection point where the symmetry axis candidate intersects the input figure; and generating straight line segments as the symmetry axis judgment segments such that the straight line segments connect the pairs of apexes respectively.

29. The method according to claim 1, wherein the step (g) comprises the steps of:

receiving a shaping element instruction from a user; and shaping the input figure according to the shaping element instruction such that the input figure becomes completely line-symmetrical with respect to the symmetry axis candidate when the symmetry axis candidate is judged to provide line symmetry.

30. The method according to claim 11, wherein the step (g) comprises the steps of:

receiving a shaping element instruction from a user; and shaping the input figure according to the shaping element instruction such that the input figure becomes completely line-symmetrical with respect to the optimum symmetry axis candidate when the symmetry axis candidate is judged to provide line symmetry.

31. The method according to claim 16, wherein the step (j) comprises the steps of:

receiving a shaping element instruction from a user; and shaping the input figure according to the shaping element instruction such that the input figure becomes completely line-symmetrical with respect to the symmetry axis candidate when the symmetry axis candidate is judged to provide line symmetry.

32. The method according to claim 24, wherein the step (j) comprises the steps of:

receiving a shaping element instruction from a user; and shaping the input figure according to the shaping element instruction such that the input figure becomes completely line-symmetrical with respect to the optimum symmetry axis candidate when the symmetry axis candidate is judged to provide line symmetry.

33. A method for determining a symmetry axis of an input figure, comprising the steps of:

extracting feature data from the input figure, the feature data including position data of apexes of the input figure;

generating symmetry axis candidates based on the feature data, each of the symmetry axis candidates passing through at least one of the apexes and middle points of sides forming the input figure;

generating symmetry axis judgment segments each connecting each of pairs of points on the input figure on both sides of a symmetry axis candidate selected one by one from the symmetry axis candidates;

calculating distance differences between the symmetry axis candidate and middle points of the symmetry judgment segments, respectively;

calculating angular differences between a right angle and angles which the symmetry judgment segments form with the symmetry axis candidate, respectively;

determining the symmetry axis candidate as the symmetry axis of the input figure based on the distance differences and the angular differences.

34. A method for determining a symmetry axis of an input figure, comprising the steps of:

extracting feature data from the input figure, the feature data including position data of apexes of the input figure;

generating symmetry axis candidates based on the feature data, each of the symmetry axis candidate passing through at least one of the apexes and middle points of sides forming the input figure;

generating symmetry axis judgment segments each connecting each of pairs of points on the input figure on both sides of a symmetry axis candidate selected one by one from the symmetry axis candidates;

calculating distance differences between the symmetry axis candidate and middle points of the symmetry judgment segments, respectively;

calculating angular differences between a right angle and angles which the symmetry judgment segments form with the symmetry axis candidate, respectively;

judging whether each of the symmetry axis candidates enables symmetry shaping of the input figure bases on the distance differences and the angular differences;

selecting an optimum symmetry axis candidate from symmetry axis candidates which are judged to enable symmetry shaping of the input figure according to variations of the distance differences and the angular differences; and determining the optimum symmetry axis candidate as the symmetry axis of the input figure.

35. A method for determining a symmetry axis of an input figure, comprising the steps of:

a) extracting feature data from the input figure, the feature data including position data of apexes of the input figure;

b) generating symmetry axis candidates based on the feature data, each of the symmetry axis candidates passing through at least one of the apexes and middle points of sides forming the input figure;

c) generating symmetry axis judgment segments each connecting each of pairs of points on the input figure on both sides of a symmetry axis candidate one by one selected from the symmetry axis candidates;

d) calculating a distance difference between the symmetry axis candidate and a middle point of a symmetry judgment segment sequentially selected from the symmetry axis judgment segments;

e) calculating an angular difference between a right angle and an angle which the symmetry judgment segment forms with the symmetry axis candidate;

f) judging whether each of the distance difference and the angular difference falls within a predetermined range;

g) storing the distance difference and the angular difference for the symmetry judgment segment when each of the distance difference and the angular difference falls within the predetermined range, and otherwise going back to the step (c) with selecting a next symmetry axis candidate;

h) repeating the steps (d) to (g) until all the symmetry judgment segments have been selected; and i) determining the symmetry axis candidate as the symmetry axis of the input figure based on both distance differences and angular differences which are stored by the step (g) when all the symmetry judgment segments have been selected.

36. The method according to claim 35, wherein:

the step (i) comprises the steps of:

judging whether each of the symmetry axis candidates enables symmetry shaping of the input figure based on the distance differences and the angular differences; and selecting an optimum symmetry axis candidate from symmetry axis candidates which are judged to enable symmetry shaping of the input figure according to variations of the distance differences and the angular differences.

37. A line-symmetrical figure shaping system comprising a program-controlled processor implementing the method according to claim 1.

38. A line-symmetrical figure shaping system comprising a program-controlled processor implementing the method according to claim 11.

39. A line-symmetrical figure shaping system comprising a program-controlled processor implementing the method according to claim 16.

40. A line-symmetrical figure shaping system comprising a program controlled processor implementing the method according to claim 24.

41. A line-symmetrical figure shaping system comprising:

- extracting means for extracting feature data from an input figure, the feature data including position data of apexes of the input figure;
- first generating means for generating symmetry axis candidates based on the feature data, each of the symmetry axis candidates passing through at least one of the apexes and middle points of sides forming the input figure;
- second generating means for generating symmetry axis judgment segments each connecting each of pairs of points on the input figure on both sides of a symmetry axis candidate selected one by one from the symmetry axis candidates;
- distance calculating means for calculating distance differences between the symmetry axis candidate and middle points of the symmetry judgment segments, respectively;
- angle calculating means for calculating angular differences between a right angle and angles which the symmetry judgment segments form with the symmetry axis candidate, respectively;
- symmetry judging means for judging whether the input figure is symmetrical with respect to the symmetry axis candidate based on the distance differences and the angular differences; and
- shaping means for shaping the input figure such that the input figure becomes completely line-symmetrical with respect to the symmetry axis candidate when the symmetry axis candidate is judged to provide line symmetry.

42. The line-symmetrical figure shaping system further comprising:

(a) means for extracting feature data from an input figure, the feature data including position data of apexes of the input figure;

(b) means for generating symmetry axis candidates based on the feature data, each of the symmetry axis candidates passing through at least one of the apexes and middle points of sides forming the input figure;

(c) means for generating symmetry axis judgment segments each connecting each of pairs of points on the input figure on both sides of a symmetry axis candidate one by one selected from the symmetry axis candidates;

(d) means for calculating a distance difference between the symmetry axis candidate and a middle point of a symmetry judgment segment sequentially selected from the symmetry axis judgment segments;

(e) means for calculating an angular difference between a right angle and an angle which the symmetry judgment segment forms with the symmetry axis candidates;

(f) means for judging whether each of the distance difference and the angular difference falls within a predetermined range;

g) means for both (i) storing the distance difference and the angular difference for the symmetry judgement segment when each of the distance difference and the angular difference falls within the predetermined range, and (ii) otherwise activating the means defined in (c) with a next symmetry axis candidate;

h) means for repeating the activation of the means defined in (d) to (g) until all the symmetry judgment segments have been selected;

i) means for judging whether the input figure is symmetrical with respect to the symmetry axis candidate based on both distance differences and angular differences which are stored by the means defined in (g) when all the symmetry judgement segments have been selected; and j) means for shaping the input figure such that the input figure becomes completely line-symmetrical with respect to the symmetry axis candidate when the symmetry axis candidate is judged to provide line symmetry.

* * * * *